US008871047B2

(12) United States Patent
Hunkeler et al.

(10) Patent No.: US 8,871,047 B2

(45) Date of Patent: Oct. 28, 2014

(54) METHOD OF, AND APPARATUS FOR, PRODUCING MULTI-LEAF, FOLDED PRINTED PRODUCTS, IN PARTICULAR PERIODICALS AND BROCHURES

(75) Inventors: Franz Hunkeler, Wikon (CH); Erich Hodel, Wikon (CH)

(73) Assignee: Hunkeler AG, Wikon (CH)

( * ) Notice: Subject to any disclaimer, the term of this patent is extended or adjusted under 35 U.S.C. 154(b) by 987 days.

(21) Appl. No.: 12/458,639

(22) Filed: Jul. 17, 2009

(65) Prior Publication Data

US 2010/0015414 A1 Jan. 21, 2010

(30) Foreign Application Priority Data

Jul. 17, 2008 (EP) .................................... 08012915

(51) Int. Cl.

*B32B 37/02* (2006.01)
*B65H 45/28* (2006.01)
*B65H 37/04* (2006.01)
*B65H 45/30* (2006.01)
*B42C 3/00* (2006.01)
*B42C 19/06* (2006.01)

(52) U.S. Cl.

CPC ................ *B65H 45/28* (2013.01); *B42C 19/06* (2013.01); *B65H 37/04* (2013.01); *B65H 45/30* (2013.01); *B42C 3/00* (2013.01)
USPC .............. 156/264; 156/91; 156/200; 156/221

(58) Field of Classification Search

CPC ......... B42C 19/06; B65H 45/28; B65H 45/30
USPC ..................... 156/91–93, 200, 221, 227, 264; 270/5.01, 5.02, 5.03, 20.1, 21.1, 32, 270/40, 41, 52.07, 52.09, 52.17, 52.18
See application file for complete search history.

(56) References Cited

U.S. PATENT DOCUMENTS 3,917,251 A * 11/1975 De Lise et al. .................. 270/37
5,156,384 A 10/1992 Donahue (Continued)

FOREIGN PATENT DOCUMENTS

DE 30 16 573 A1 11/1981
DE 3016573 * 11/1981 ............ B42D 15/00

(Continued)

OTHER PUBLICATIONS

U.S. Appl. No. 12/453,661, filed May 18, 2009 in the name of Gerhard et al.

*Primary Examiner* — Philip Tucker
*Assistant Examiner* — John Blades
(74) *Attorney, Agent, or Firm* — Oliff PLC

(57) ABSTRACT

In a material web which is printed in a digital printing station and moved in an advancement direction, a first material-web strand, which is formed by at least one printed material-web portion, is combined with a second material-web strand, which is formed by two printed material-web portions, by folding. The two material-web strands are connected to one another by an adhesive. Subproducts are then severed from the thus interconnected material-web strands by cross-cutting. These subproducts comprise a first printed sheet, severed from the first material-web strand, and a second printed sheet, connected to the first printed sheet and severed from the second material-web strand. The subproducts are then positioned one upon the other to form a stack, the subproducts being connected to one another by an adhesive in the region of the subsequent folding line. The stacked subproducts are then folded about a folding line to form an end product.

5 Claims, 7 Drawing Sheets

(56) References Cited

U.S. PATENT DOCUMENTS

| | | | | |
|---|---|---|---|---|
| 5,242,521 | A | 9/1993 | Hibsch et al. | |
| 6,363,851 | B1 * | 4/2002 | Gerhard et al. | 270/37 |
| 2001/0040371 | A1 | 11/2001 | Dahlquist | |
| 2003/0044260 | A1 | 3/2003 | Grunder et al. | |
| 2004/0222583 | A1 | 11/2004 | Dannemann et al. | |

FOREIGN PATENT DOCUMENTS

| | | | |
|---|---|---|---|
| EP | 1 288 015 | A1 | 3/2003 |
| EP | 1 213 245 | B1 | 10/2003 |
| EP | 1 431 025 | A2 | 6/2004 |
| EP | 1 471 022 | A1 | 10/2004 |
| EP | 1 661 673 | A1 | 5/2006 |
| FR | 2 721 009 | A1 | 12/1995 |
| WO | WO 2005/072980 | A2 | 8/2005 |

* cited by examiner

A
B
C
D
E
a)
b)
c)
d)
e)
f)
g)
12a
23a
23b
23c
25'
25"

METHOD OF, AND APPARATUS FOR, PRODUCING MULTI-LEAF, FOLDED PRINTED PRODUCTS, IN PARTICULAR PERIODICALS AND BROCHURES

CROSS-REFERENCE TO RELATED APPLICATIONS

This application claims priority under 35 U.S.C. 119 from European Patent Application No. 08 012 915.8, the disclosure of which is incorporated herein by reference in its entirety.

BACKGROUND

In the production of printed products, such as periodicals, brochures, booklets and the like, in digital printing, the pages of a printed product are printed one after the other. Only after all the pages of a product have been printed the printing of the next product begins.

The digital printers which have been available up until now, and which can be used to print material webs of a width of up to 50 cm, make it possible, for producing printed products of DIN A4 format (or 8½×11 inch), for two pages of the same product which have their longitudinal side running parallel to the longitudinal extent of the material web to be printed one beside the other (so-called double use). However, use is already being made of digital printing machines which can print material webs of a width of 67 cm. Such digital printing machines make it possible, in the case of printed products of the abovementioned DIN A4 format, for three pages of the same product to be printed one beside the other (triple use).

SUMMARY

Taking as a basis a material web which is printed in a digital printing machine and is printed with three or more pages of a printed product arranged one beside the other, it is therefore an object of the present invention to produce finished printed products in a manner that is as straightforward and time-saving, and therefore cost-effective, as possible.

This object is achieved according to the claimed invention by a method having the features of: (i) moving the material web in an advancement direction, (ii) combining a first material-web strand, which is formed by at least one printed material-web portion, with a second material-web strand, which is formed by two printed material-web portions, by connecting the first material-web strand to the second material-web strand by means of an adhesive along a connecting line running in the longitudinal direction of the material web; (iii) severing subproducts from the interconnected first and second material-web strands by cutting transversely to the advancement of the material web, the subproducts comprising a first printed sheet, severed from the first material-web strand, and a second printed sheet, connected to the first printed sheet and severed from the second material-web-strand; (iv) stacking the subproducts to form a stack, wherein the subproducts are connected to one another during stacking or following stacking; and (v) folding the subproducts individually or as a stack about a folding line which runs between the adjacent printed portions of the second printed sheet. This object is also achieved according to the claimed invention by an apparatus having the features of: (i) a combining station arranged downstream of a digital printing station and in which a first material-web strand, which is formed by at least one printed material-web portion, is combined with a second material-web strand, which is formed by two printed material-web portions, and which has a device for connecting the two material-web strands by means of an adhesive along a connecting line running in the longitudinal direction of the material web; (ii) a crosscutting station which is arranged downstream of the combining station and severs subproducts from the interconnected material-web strands by cutting transversely to the advancement direction of the material web; (iii) means for advancing the printed material web through the combining station and to the crosscutting station; (iv) a stacking station for stacking the subproducts to form a stack; and (v) a folding station for folding the individual subproducts or the stacked subproducts about a folding line. The printed product produced in the manner according to the invention is distinguished by the features of a folding station being arranged between the crosscutting station and the stacking station and serves for folding the individual subproducts.

Other preferred developments of the method according to the invention and of the apparatus according to the invention form the subject matter of the rest of the dependent claims.

BRIEF DESCRIPTION OF THE DRAWINGS

The invention will be explained in more detail hereinbelow with reference to the drawings, in which, purely schematically.

DETAILED DESCRIPTION OF EMBODIMENTS

Figure 1:
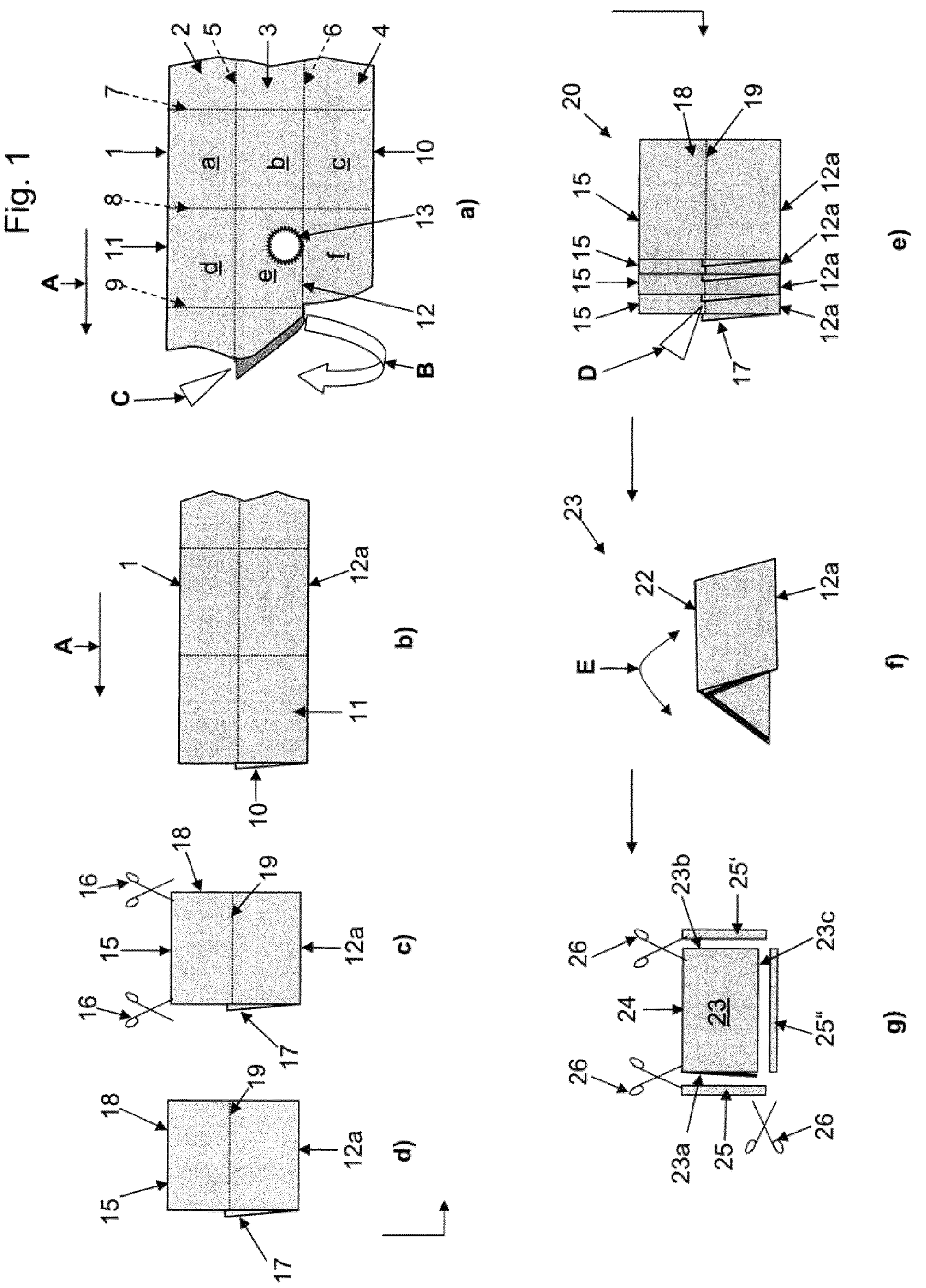
FIG. 1 shows the sequence of the method according to the invention for a first embodiment.

The Figures will now be used to explain a first embodiment of the method according to the invention.

The material web 1, which is printed in a digital printing station, has three printed material-web portions 2, 3 and 4 of equal width arranged one beside the other. FIG. 1*a* indicates the delimitation between the material-web portions 2, 3 by dotted lines 5, 6 which run in the longitudinal direction of the material web 1. Each material-web portion 2, 3, 4 is printed with successive pages of a printed product, in each case 3 pages a, b, c and d, e, f being arranged one beside the other with their longitudinal sides running parallel to the longitudinal direction of the material web 1. The delimitation between the individual pages of each material-web strand 2, 3, 4 in the longitudinal direction of the material-web 1 is indicated by dotted lines 7, 8 and 9.

The material web 1, coming from the digital printing station, is moved forward in the direction of the arrow A, running in the longitudinal direction of the material web 1. During this forward movement, a first material-web strand 10, which is formed by the material-web portion 4, is folded against a second material-web strand 11, which is formed by the two other material-web portions 2 and 3, about a line 12 which runs parallel to the advancement direction A and coincides with the delimitation line 6, this being indicated by the arrow B in FIG. 1*a*. The second material-web strand 11 is double the width of the first material-web strand 10. Prior to the material-web strand 10 being folded over, the material web 1 is perforated along the folding line 12, as is indicated in FIG. 1*a* by the merely schematically illustrated perforating tool 13. This perforating operation, which serves as a preparatory step for the subsequent folding operation, can also be left out.

In order to connect the material-web strands 10 and 11 combined in this way, an adhesive is applied to the second material-web strand 11 in the longitudinal direction of the material web 1 in the region of the center line of the material-web strand 11, i.e. in the region of the delimitation line 5, this being indicated in FIG. 1*a* by the arrow C. FIG. 2 illustrates a front view of the material web 1 with the two material-web strands 10, 11 connected to one another, the adhesive connection being designated by 14 and the folding edge being designated by 12*a*.

In a next step, subproducts 15 are severed continuously, along a line running transversely to the advancement direction A, from the material web 1, which is advanced further in the advancement direction A and has the first material-web strand 10 folded over against the second material-web strand 11 and adhesively bonded thereto (FIG. 1*b*), this severing being symbolized in FIG. 1*c* by the scissors 16. Each subproduct 15 comprises a first printed sheet 17, severed from the first material-web strand 10, and a second printed sheet 18, severed from the second material-web strand 11. The two sheets 17 and 18 are adhesively bonded to one another in the region of a center line 19 of the second sheet 18.

Figure 3:
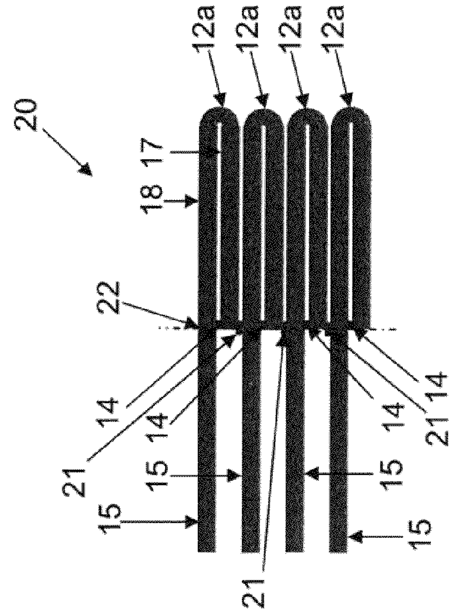
FIG. 3 shows a front view of the subproducts positioned one upon the other to form a stack and connected to one another during the method according to FIG. 1.

These subproducts 15 (FIG. 1*d*) are then positioned one upon the other, with their folding edges 12*a* aligned in relation to one another, to form a stack 20, which is illustrated schematically in FIG. 1*e*. Each subproduct 15 here is connected by means of an adhesive to the previous subproduct 15 on the stack 20 in the region of the center line 19 of the second sheet 18, this center line coinciding with the longitudinal center line of the broader material-web strand 11 and Of the subsequent folding line. The application of an adhesive to the second sheet 18 is indicated in FIG. 1*e* by the arrow D. FIG. 3 shows a front view of the subproducts 15 positioned one upon the other to form the stack 20, the adhesive connection between the subproducts 15 being designated by 21.

Figure 4:
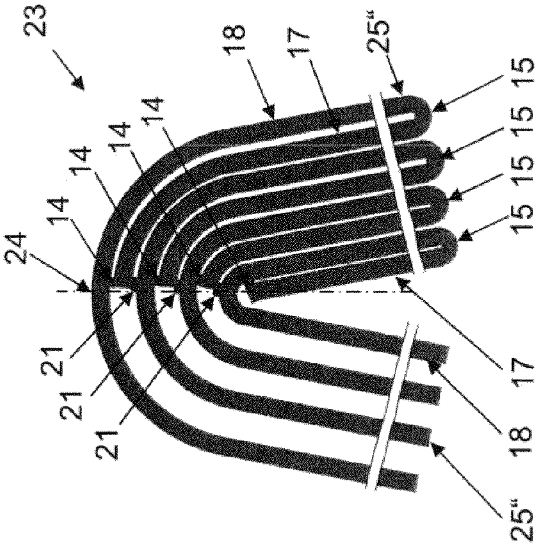
FIG. 4 shows a front view of a folded end product produced by the method according to FIG. 1, FIGS. 5-7 show, in illustrations corresponding to FIGS. 2 to 4, intermediate products and end products which are produced according to a variant of the method illustrated in FIG. 1.

In the following method step, the stacked subproducts 15 are folded along a folding line 22, which coincides with the center line 19 of the second sheets 18, to form an end product 23, this being indicated in FIG. 1*f* by the arrow E. FIG. 4 illustrates a front view of the folded end product 23, of which the folding edge is designated by 24.

As is shown in FIG. 1*g*, finally the end product 23 is trimmed along the side edges 23*a*, 23*b*, which are adjacent to the folding edge 24, and along the side edge 23*c*, which is located opposite the folding edge 24. Edge portions 25, 25', 25" are cut away here along these side edges 23*a-c*, as is symbolized by the scissors 26.

The operation of cutting away the edge portions 25 and 25' can be done away with in some circumstances, e.g. when the quality of the end product 23 does not have to meet particularly stringent requirements.

Figure 5:
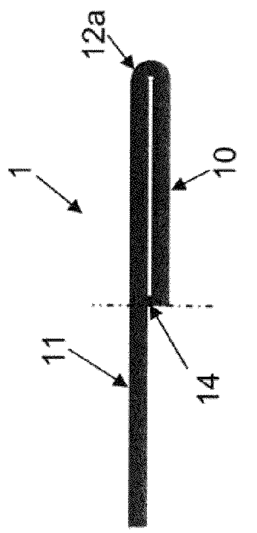
Figure 6:
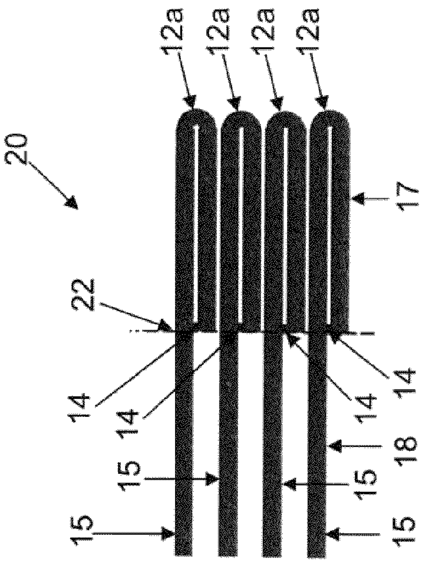
Figure 7:
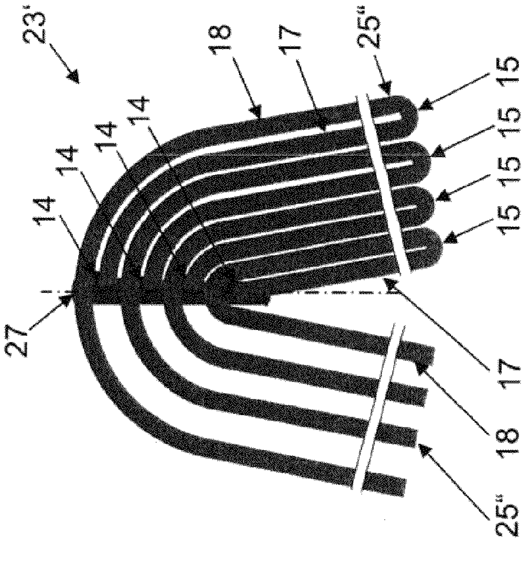

With reference to FIGS. 5 to 7, which correspond to the illustrations of FIGS. 2 to 4, a description will now be given of a variant of the method which has been explained above with reference to FIG. 1.

In the case of this variant, the operations of folding over the first material-web strand 10 and of adhesively bonding the latter to the second material-web strand 11 are identical to those in the method described with reference to FIG. 1. FIG. 5 is therefore identical to FIG. 2. It is also the case that the operations of severing subproducts 15 according to FIGS. 1*c* and 1*d* and of stacking the subproducts 15 to form a stack 20 take place in the manner already described.

In contrast to the method described with reference to FIG. 1, in this variant the subproducts 15 are not connected to one another when they are positioned one upon the other to form the stack 20, that is to say the operation of applying an adhesive between the subproducts 15 located one upon the other, and thus the adhesive connection 21 itself, are dispensed with. This can be seen from FIG. 6, which otherwise corresponds to FIG. 3.

The subproducts 15 located one upon the other are folded about a folding line 22 to form an and product 23', the stacked subproducts 15 being connected to one another in a suitable manner, preferably by stapling, prior to, or following, folding along the folding line 22 or the folding edge 24. FIG. 7, which corresponds to FIG. 4, shows a front view of the folded and stapled end product 231, the schematically illustrated stapling connection being designated by 27.

If required, the end product 23' can, as is described with reference to FIG. 1*e*, be trimmed along the side edges.

Figure 2:
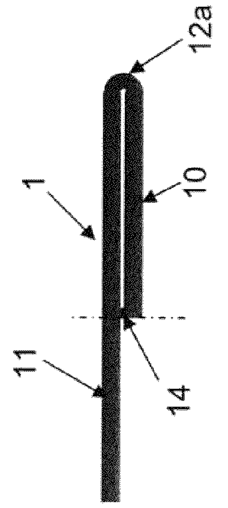
FIG. 2 shows a front view of the two material-web strands combined and connected to one another during the method according to FIG. 1.
Figure 8:
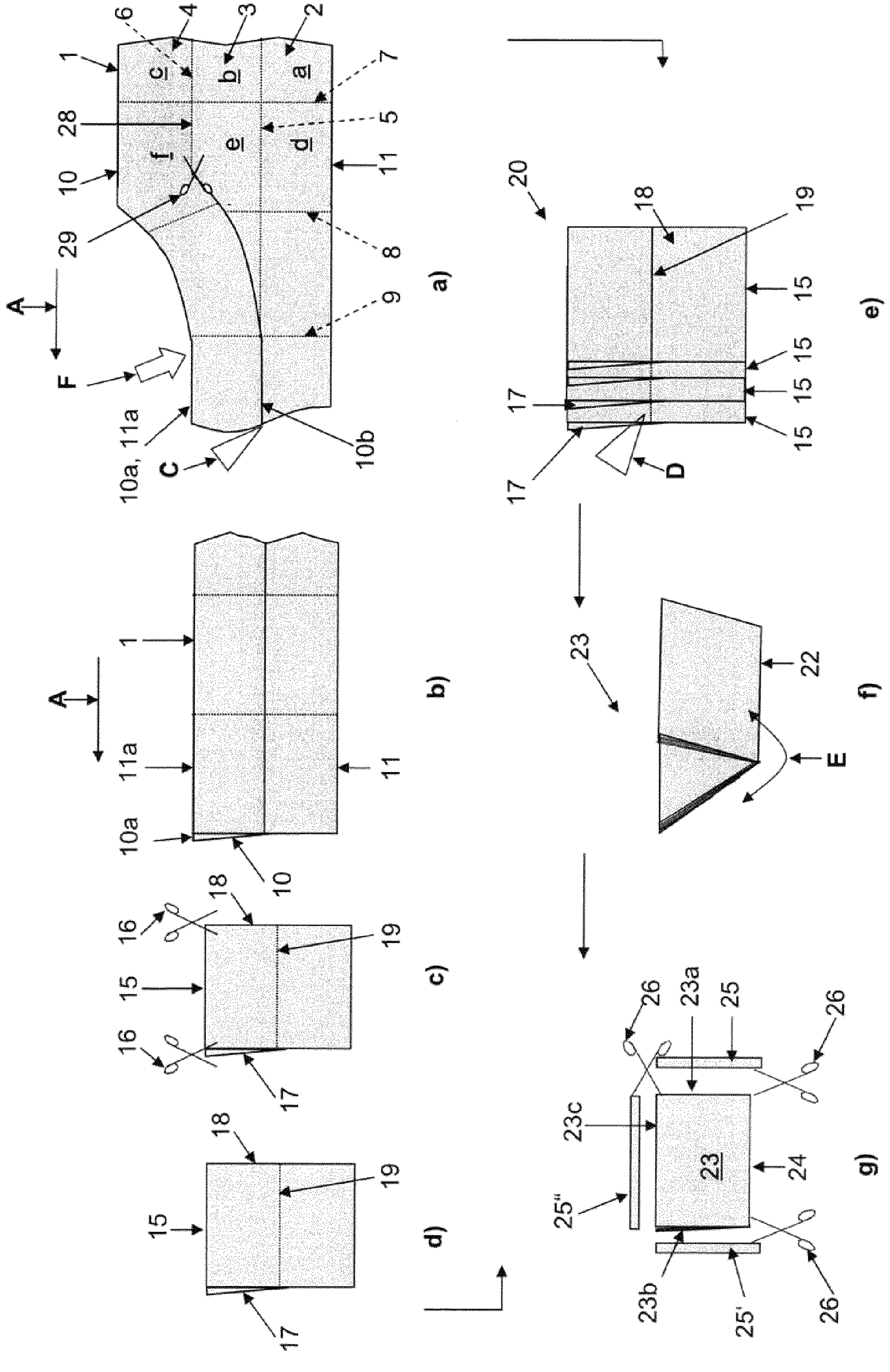
FIG. 8 shows the sequence of the method according to the invention for a second embodiment.

FIG. 8, which corresponds in illustrative terms to FIG. 1, will now be used to explain a second embodiment of the method according to the invention.

This second embodiment differs from the first embodiment according to FIG. 1 by a different way of combining the two material-web strands 10 and 11. For corresponding features and parts in FIG. 8 and the associated FIGS. 9 to 11, use is therefore made of the same designations as in FIGS. 1 to 7. The description of this second embodiment will make repeated reference to the description relating to FIGS. 1 to 7.

During the forward movement of the printed material web 1 coming from a digital printing station, the first, narrower material-web strand 10, rather than being folded over, as in the case of the first embodiment, against the second material-web strand 11, is severed from the second material-web strand 11 along a cutting line 28, which runs parallel to the advancement direction A and coincides with the delimitation line 6, this severing being symbolized in FIG. 8*a* by the scissors 29. The cut-off material-web strand 10 is then positioned on the second material-web strand 11 such that the two material-web strands 10 and 11 are aligned with one another along one of their longitudinal edges 10*a*, 11*a*, this being indicated in FIG. 8*a* by the arrow F. At the same time, the first material-web strand 10—in the same way as in the first embodiment—is connected to the second material-web' strand 11 by means of an adhesive along its other longitudinal edge 10*b*. The application of the adhesive to the second material-web strand in the longitudinal direction of the material web 1 in the region of the center line of the second material-web strand 11, i.e. in the region of the delimitation line 5, is indicated by the arrow C.

The rest of the method steps illustrated in FIGS. 8*b* to 8*g*, namely the operations of severing subproducts 15 from the material web 1 with the first material-web strand 10 positioned on the second material-web strand 11 and connected thereto (FIGS. 8*b* to 8*d*), of stacking the subproducts 15 to form a stack 20 (FIG. 8*e*), of folding the stacked subproducts 15 along a folding line 22 to form an end product 23 (FIG. 8*f*) and of trimming the end product 23 along the side edges 23*a*, 23*b*, 23*c* (FIG. 8*g*) take place in the same way as for the first exemplary embodiment. Reference is therefore made to the appropriate explanations in the description of the method according to FIG. 1. It should be mentioned, however, that the operation of trimming the end product 23 along the side edges 23*a* and 23*b* is not usually necessary any longer since one of these side edges 23*a*, 23*b* is formed by a region of a longitudinal edge of the material web 1 and the other side edge is formed by a region of the cutting edge 28.

Figure 9:
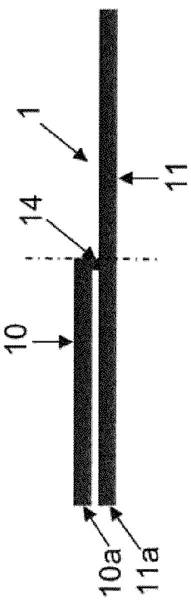
FIG. 9 shows a front view of the two material-web strands combined and connected to one another during the method according to FIG. 8.

The material web 1 which is shown in front view in FIG. 9 and has material-web strands 10, 11 located one above the other and connected to one another differs from the material web 1 which is shown in FIG. 2 only by the fact that the material-web strands 10, 11 are not connected to one another along their aligned longitudinal edges 10*a*, 11*a*. The same applies to the stacked subproducts 15, which are shown in FIG. 10, and to the end product 23 according to FIG. 11.

Figure 10:
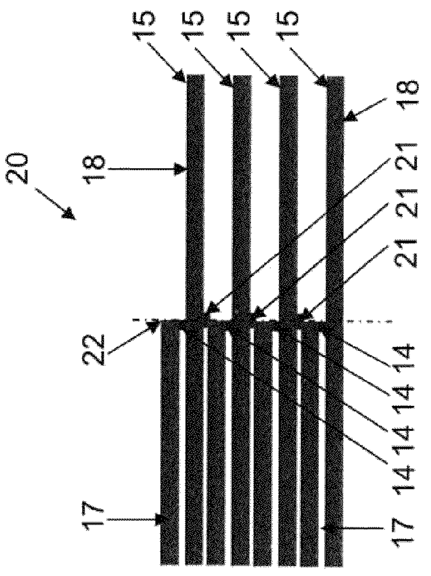
FIG. 10 shows a front view of the subproducts positioned one upon the other to form a stack during the method according to FIG. 8.
Figure 11:
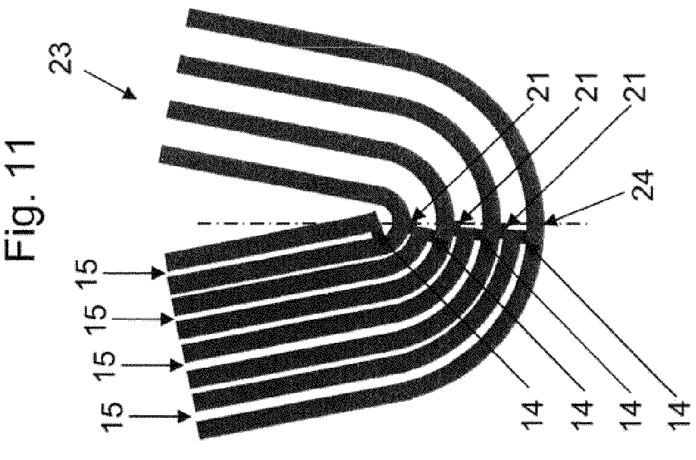
FIG. 11 shows a front view of a folded end product produced by the method according to FIG. 8, FIGS. 12-14 show, in illustrations corresponding to FIGS. 9 to 11, intermediate products and end products which are produced according to a variant of the method illustrated in FIG. 8.
Figure 12:
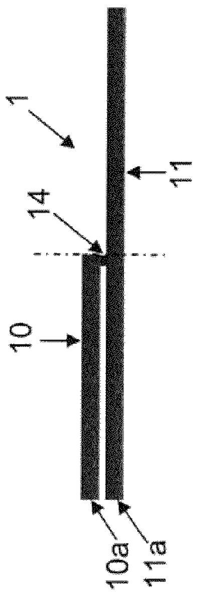
Figure 13:
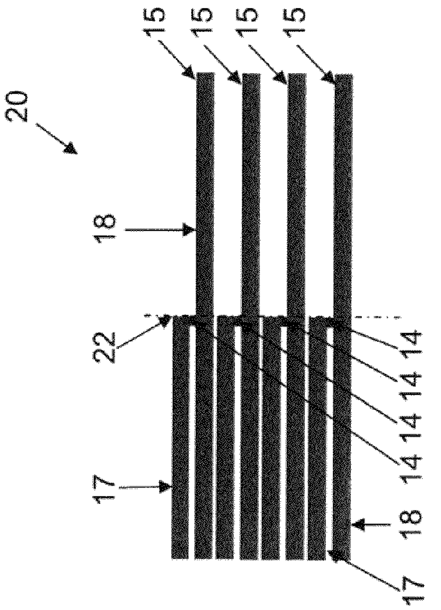
Figure 14:
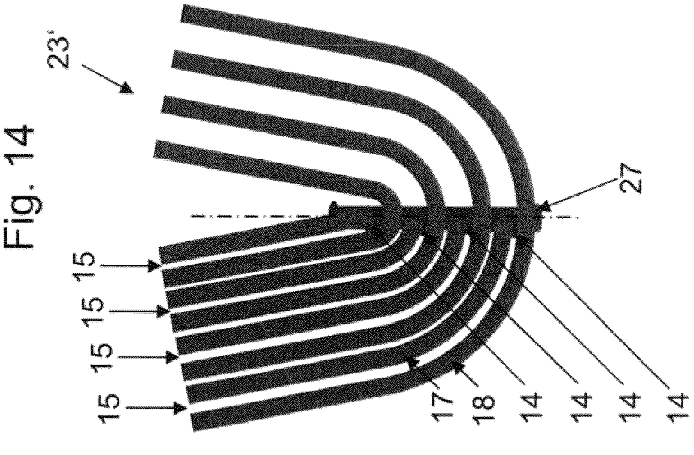

FIGS. 12 to 14, which correspond in illustrative terms to FIGS. 9 to 11, will now be used to explain a variant of the second embodiment of the method according to the invention in FIG. 8.

This variant corresponds to the variant according to FIGS. 5 to 7. This means that, in the case of the variant which is shown in FIGS. 12 to 14, the subproducts 15 are not connected to one another, and the adhesive connection 21 is thus dispensed with, as they are positioned one above the other. Instead, the stacked subproducts 15 are connected to one another, preferably by stapling, prior to, or following, folding along the folding edge 24. This stapling connection is designated by 27 in FIG. 14, just as it was in FIG. 7.

Figure 15:
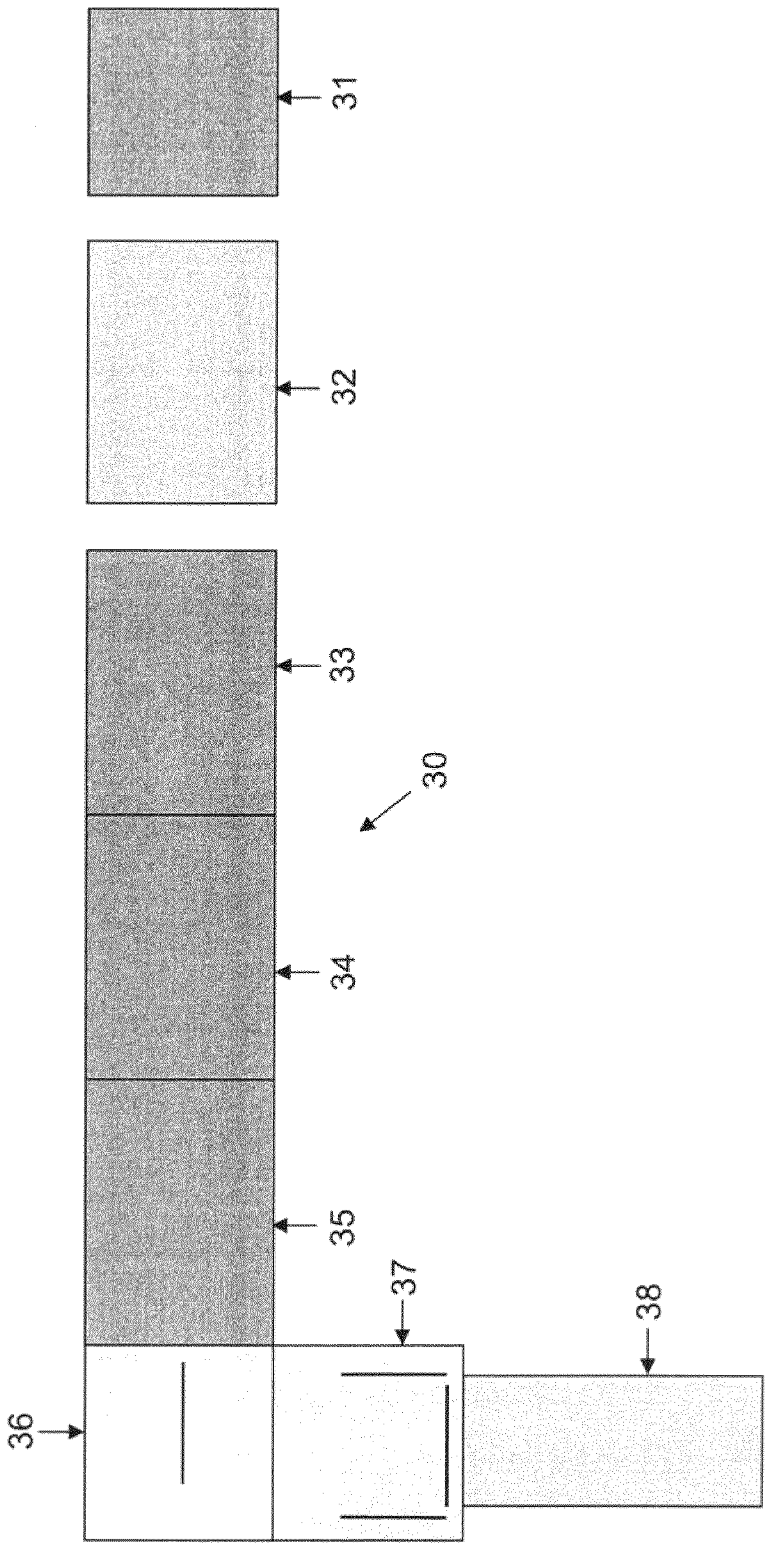
FIG. 15 shows a plan view of an installation for producing printed products by the method according to FIG. 1.

FIG. 15 will now be used to describe an apparatus for implementing the method according to the invention (first and second exemplary embodiments).

FIG. 15 shows, purely schematically and in plan view, a processing line 30 which has an unwinding station 31 by means of which the material web which is to be printed can be unwound from a roll. This unwinding station 31 may be, for example, a "Unwinding Module UW6" as sold by the applicant. The unwinding station 31 has a digital printing station 32 arranged downstream of it. The material web, which is printed in this digital printing station 32, is fed to a combining station 33, in which the material-web strands 10, 11 are combined and connected to one another by means of an adhesive. For implementing the first exemplary embodiment of the method according to the invention in FIG. 1, the combining station 33 may be a longitudinal folding station of known construction. For implementing the second embodiment of the method according to the invention in FIG. 8, the combining station 33 is a processing unit for severing the first material-web strand 10 from the second material-web strand 11 and then positioning the two material-web strands 10, 11 one above the other, as sold for example as "Web Merger WM6-Even" by the applicant. However, it is also possible to use, as combining station 33, a combined processing station which optionally brings together the material-web strands 10, 11 according to the first embodiment or according to the second embodiment. Such a combined processing station forms the subject matter of European patent application No 08 009 232.3 dated May 20, 2008 and the related U.S. patent application Ser. No. 12/453,661 filed May 18, 2009 and is sold as "Folder Merger FM6" by the applicant. Each embodiment of the combining station 33 is provided with a device for connecting the two material-web strands 10, 11 along a connecting line by means of an adhesive.

The combining station 33 has a cross-cutting station 34 for severing the subproducts 15 arranged downstream of it. The CS6-I cross-cutting module as sold by the applicant is suitable as such a cross-cutting station 34.

The subproducts 15 leaving the, cross-cutting station 34 are positioned one upon the other in a stacking station 35 to form a stack 20. The collecting apparatus which is described in EP-A-1 471 022, and is sold as "Drum Collator DC7" by the applicant, is particularly suitable as the stacking station 35. For implementing the method according to the invention in FIGS. 1 and 8, the stacking station 35 is provided with a device for applying an adhesive to the respectively uppermost subproduct 15 in the stack 20 in the region of the subsequent folding line.

The subproducts 15 stacked in the stacking station 35 are folded in a folding station 36 to form an end product 23. For the folding station 36, use can be made of, for example, the folding apparatus described in EP-B-1 213 245 or of a ZK500 knife folder as sold by Griesser & Kunzmann GmbH & CO. KG, Wellendingen (Germany).

The folding station 36 is followed by a side-edge-cutting station 37, in which the folded end products 23 are trimmed along the side edges 23*a*, 23*b* and 23*c*. This side-edge-cutting station 37 can be dispensed with in some circumstances.

The finished end products 23 are transferred to a removal module 38 at the end of the processing line 30.

For implementing the variant of the first and second embodiments of the method according to the invention, the processing line 30 which is shown in FIG. 15 is supplemented by a stapling station, which is arranged for example between the folding station 36 and the side-edge-cutting station 37.

If the material web 1 is printed in the digital printing station 32 such that 4 printed material-web portions are arranged one beside the other, then end products are produced in a manner similar to that described above. In contrast to the embodiments described with reference to FIGS. 1 to 14, the two combined material-web strands here are of the same width and each comprise two printed material-web portions arranged one beside the other. The subproducts which are produced in the manner described here then comprise a folded, outer printed sheet and a folded, inner printed sheet, which is arranged within the outer sheet. The two sheets are connected to one another by means of an adhesive in the region of the folding edge of the outer sheet.

A description will be given hereinbelow of a third exemplary embodiment of the subject matter of the invention, which is not shown in the Figures and in which the operations of stacking the subproducts 15 and of connecting the same to one another take place differently to the exemplary embodiments according to FIGS. 1 and 8. In this third exemplary embodiment, subproducts 15 are produced in the manner described with reference to FIGS. 1*a*-1*d* and 8*a*-8*d*. These subproducts 15, then, are folded in the manner of a gable roof along the center line of the sheet 18 and are then positioned one above the other in straddling fashion to form a stack. In order to connect the subproducts 15 to one another, an adhesive is applied to the inside or outside of the subproducts 15, along the folding line coinciding with the center line 19, prior to the subproducts being positioned one above the other. The adhesive here may be applied continuously or just in certain regions. Such operations of subproducts being positioned one above the other and connected by means of adhesive are described in detail, for example, in WO-A-2005/072980.

In a variant of this third exemplary embodiment, it is possible for the subproducts located one above the other to be connected, not by means of an adhesive applied prior to or during stacking of the subproducts, but by stapling along the folding line of the subproducts.

What is claimed is:

1. A method of producing a multi-leaf, folded printed product based on a material web which is printed in a digital printing station and has at least three printed material-web portions arranged one beside the other in its longitudinal direction, the method comprising:

moving the material web in an advancement direction;

combining a first material-web strand, which is formed by one of the at least three printed material-web portion, with a second material-web strand, which is formed by two of the at least three printed material-web portions, while the material web is moved in the advancement direction;

connecting the first material-web strand to the second material-web strand by means of an adhesive being applied in the longitudinal direction of the material web in a region of a center line of the second material-web strand;

severing subproducts from the interconnected first and second material-web strands by cutting transversely to the advancement direction of the material web, the subproducts comprising a first printed sheet, severed from the first material-web strand, and a second printed sheet, connected to the first printed sheet and severed from the second material-web strand, wherein a width of the second printed sheet is double a width of the first printed sheet, stacking the subproducts to form a stack, wherein the subproducts are connected to one another along or in the region of the center line of the second material-web strand during stacking or following stacking, the first printed sheets are arranged alternatingly with the second printed sheets, the first printed sheets being severed from the first material-web strand and the second printed sheets being severed from the second material-web strand on the stack, and folding the subproducts as a stack about a folding line which runs between the adjacent printed portions of the second printed sheet to form an end product wherein the folding line defines a first side and a second side of the end product and wherein the end product comprises on the first side twice the number of leaves than on the second side.

2. The method of claim 1, wherein, in order to combine the two material-web strands, the first material-web strand is folded against the second material-web strand about a line parallel to the advancement direction of the material web.

3. The method of claim 1, wherein, in order to combine the two material-web strands, the first material-web strand is severed along a line parallel to the advancement direction of the material web and the two material-web strands are then positioned one above the other.

4. The method of claim 1, wherein, during stacking to form the stack, the subproducts are connected to one another by means of an adhesive in the region of the folding line.

5. The method of claim 1, wherein the subproducts located one upon the other in the stack are connected to one another by stapling along the folding line.

* * * * *